United States Patent

Brown et al.

[11] Patent Number: 5,982,577
[45] Date of Patent: Nov. 9, 1999

[54] BATTERYLESS, SPRING-POWERED PORTABLE CASSETTE PLAYER

[76] Inventors: Paul Brown, 16 Trotting Way, Kanata, Ontario, Canada, K2M 1B2; Anie Galipeau, 1510 Riverside Dr., Apt. 1507, Ottawa, Ontario, Canada, K1G 4X5

[21] Appl. No.: 08/977,202

[22] Filed: Jul. 28, 1997

Related U.S. Application Data

[63] Continuation of application No. 08/414,734, Mar. 31, 1995, abandoned.

[51] Int. Cl.⁶ .............................. G11B 5/008; G11B 31/00
[52] U.S. Cl. .......................... 360/96.3; 360/137; 369/63; 369/68
[58] Field of Search ........................... 360/90, 96.3, 137; 369/31, 63, 64, 68

[56] References Cited

U.S. PATENT DOCUMENTS

| | | | |
|---|---|---|---|
| 2,034,888 | 3/1936 | Wilhelm | 369/63 |
| 2,609,457 | 9/1952 | Thurm | 360/90 |
| 2,936,342 | 5/1960 | Kallmann | 360/117 |
| 3,621,398 | 11/1971 | Willis | 325/119 |
| 3,633,106 | 1/1972 | Willis | 325/185 |
| 3,763,969 | 10/1973 | Summerfield | 369/63 |
| 3,864,745 | 2/1975 | Platt | 360/96 |
| 3,914,789 | 10/1975 | Coker, Jr. et al. | 360/2 |
| 4,001,887 | 1/1977 | Platt et al. | 360/90 |
| 4,017,905 | 4/1977 | Convertine et al. | 360/96 |
| 4,169,992 | 10/1979 | Nash | 322/29 |
| 4,360,860 | 11/1982 | Johnson et al. | 362/192 |
| 4,524,437 | 6/1985 | Koike | 369/67 |
| 4,669,007 | 5/1987 | Fujishige | 369/63 |

FOREIGN PATENT DOCUMENTS

| | | |
|---|---|---|
| 145557 | 1/1913 | Canada . |
| 222126 | 8/1922 | Canada . |
| 286381 | 1/1929 | Canada . |
| 301670 | 7/1930 | Canada . |
| 382904 | 7/1939 | Canada . |
| 391079 | 9/1940 | Canada . |
| 416276 | 11/1943 | Canada . |
| 483349 | 5/1952 | Canada . |
| 711013 | 6/1965 | Canada . |
| 806958 | 2/1969 | Canada . |
| 843670 | 6/1970 | Canada . |
| 57-33454 | 2/1982 | Japan . |
| 217492 | 6/1924 | United Kingdom . |
| 1180168 | 2/1970 | United Kingdom . |
| 1282967 | 7/1972 | United Kingdom . |
| 1432900 | 4/1976 | United Kingdom . |
| 2262324 | 6/1993 | United Kingdom . |

*Primary Examiner*—William J. Klimowicz
*Attorney, Agent, or Firm*—Martin J. Marcus

[57] ABSTRACT

A novel system, e.g., an audio cassette player, is provided herein. The system simultaneously provides mechanical motion driven by a rotatable drive shaft which is rotating at a continuous predetermined desired speed, and for generating a voltage output by an electrical generator having a rotor which is rotating at a continuous predetermined desired speed, the rotatable drive shaft being non-concentric with, being laterally-spaced-apart from, and being parallel to the rotor. The system includes a prime mover which comprises a windable driving spring, which, in turn, includes an interconnecting drive train for separately drivably connecting the driving spring both to the rotatable drive shaft and to the rotor of the electrical generator. The interconnecting drive train comprising a gear train, which has a driving section which is connected to the driving spring means and which is common for driving both the rotatable drive shaft and the rotor at the electrical generator. It also includes two driven sections which are laterally-spaced-apart from one another and which extend in parallel from the driving section. One of the driven sections is drivably-connected to the rotatable drive shaft. The other one of the driven sections is drivably-connected to the rotor of the electrical generator. A speed governor is included for controlling unwinding of the driving spring so as to cause the driving spring to drive both the rotatable drive shaft and the rotor of the electrical generator at the respective continuous predetermined desired speeds.

14 Claims, 4 Drawing Sheets

BATTERYLESS, SPRING-POWERED PORTABLE CASSETTE PLAYER

This application is a continuation of U.S. application Ser. No. 08/414,734, filed Mar. 31, 1995, now abandoned.

BACKGROUND OF THE INVENTION (a) Field of the Invention

This invention relates to a system for the simultaneous generation of mechanical motion and voltage. In one particular embodiment, it relates to portable audio cassette players.

(b) Description of the Prior Art

In many parts of the world there are locations without electric power lines. This means that electrical devices need to be battery operated. Moreover, in many such regions, batteries can be difficult to obtain and may furthermore be relatively expensive.

In many instances travellers, who rely on batteries to power electrical devices, may be disappointed when the batteries run out. In Arctic regions, it is known that batteries lose power rapidly dependent on the temperature. Loss of battery power for electrically-powered devices would be serious. In many other instances for emergency application, an electrical device may not be used frequently but it must be reliable when such use is essential. Under such conditions, batteries must be checked periodically to ensure that power is available as and when required.

Playback equipment for audio recordings is well known. Earliest examples of audio players were phonographs for reproducing sound recorded as an unevenness in the surfaces of grooves formed upon records. These initially were cylindrical and later were made in a flat circular form. In the use of a phonograph for playing flat records, for instance, a record is rotated upon a turntable beneath a tone arm which, in known manner, is caused to vibrate by its engagement with the uneven groove surface of the record. These vibrations are converted into electrical impulses corresponding to the vibrations and these impulses are transmitted to an amplifier which amplifies the impulses as sound. Originally, prime movers comprising manually windable driving springs were incorporated into phonographs for rotating turntables. Examples of such constructions are shown, for instance, in early Canadian Patent No. 222,126 granted in 1922, Canadian Patent No. 286,381 granted in 1929 and Canadian Patent No. 301,670 granted in 1930. In these patents, governors are described as being incorporated to ensure that the turntables are rotated at a controlled constant speed.

While mechanical prime movers were used for rotating turntables during early designs of phonographs and such prime movers were used over a lengthy period of years, the phonographs were, for all other purposes, operated by electrical power. As advancements were made in electrical engineering and new electrical devices were being developed and were being improved, after the 1920's, new designs of phonographs incorporated electrically powered driving means for rotating the turntables. As a result, from that particular time onwards all operations, including the driving of turntables, of phonographs have been operated by electrical power.

More recently, audio cassette and then compact disc technology has been developed as other means of recording sound. Audio cassette players and compact disc players are operated completely by electrical power, as is only to be expected with present technical knowledge. Electrical power for this purpose is provided either from the general electrical power supply, or, in the case of portable audio cassette and compact disc players, from batteries.

There are problems, however, with present-day batteries which may detract, under certain conditions, from the appeal of audio cassette players and compact disc players. For instance, in extremely cold weather conditions, batteries are known to lose power and this may result in a failure in their operation. In addition, present-day batteries have a limited useful life under any temperature condition and replacement batteries may be difficult or even impossible to find in certain geographical regions.

Recognition of many of the above problems was provided in G.B. Patent Application No. GB 2,262,324 A, published 16.06.1993 in the name of T. G. Baylis. That publication provided an electrical generator for powering a radio which comprised a spring motor which was wound up by way of a key such that the subsequent rotation of a torque drum as the stressed spring unwound therefrom generates electrical power. The rotational speed of the drum was geared up by gear means and rotated the rotor of an electrical motor to generate an output voltage. The output voltage was regulated by way of a Zener diode and was fed to a radio by way of a jack plug.

SUMMARY OF THE INVENTION (a) Aims of the Invention

The present invention is concerned with devices which require both mechanical motion and electrical energy and seeks to provide such a device, which, in use, will obviate the above problems.

Accordingly, it is one object of this invention to provide a system for the simultaneous generation of mechanical motion and electrical energy using a simple mechanical device.

Another object of this invention is to provide such a device which is equally operative in tropical regions and in Arctic regions.

Yet another object of this invention is to provide such a device which does not use batteries and thus is more economical to operate.

A still another object of this invention, is to provide such a device which, since it does not use batteries, obviates the problem of battery disposal, which can contaminate landfills if they are buried, or otherwise cause ecological problems.

A more particular object of the present invention is to provide an audio cassette or compact disc player which takes advantage of a system as previously indicated as being desirable.

(b) Statements of Invention

By this invention, a system is provided including a rotatable drive shaft, and electrical generating means including a rotor for simultaneously providing mechanical motion driven by the rotatable drive shaft, and for generating a voltage output by the driving of the rotor of the electrical generating means, the system including a prime mover comprising: a windable driving spring means, the driving spring means including a first interconnecting drive train for drivably connecting the driving spring means to the rotatable drive shaft for rotating the rotatable drive shaft at a first selected speed, and a second interconnecting drive train for drivably connecting the driving spring means to the rotor of the electrical generating means for rotating the rotor at a second selected different speed. Speed governing means are provided, the speed governing means being operatively connected between the driving spring means and the first interconnecting drive train for controlling the unwinding of the driving spring means so as to cause the driving spring means to drive the rotatable drive shaft at the first selected speed. The speed governing means is also operatively connected between the driving spring means and the second interconnecting drive train, for controlling the unwinding of the driving spring means so as to cause the driving spring means to drive the rotor of the electrical generating means at the second different selected speed.

The present invention also provides an audio cassette player comprising: an audio play-back head located in a signal pick-up station; a tape drive mechanism comprising a rotatable drive shaft for driving an audio cassette tape in lineal movement progressively through the signal pick-up station to permit the play-back head to receive signals from the audio cassette tape; amplifying means electrically-connected to the head to receive signals from the head; electrical generating means including a rotor for providing electrical power to the amplifying means. System includes a prime mover for such audio cassette player. Such prime mover comprises a windable driving spring means, the driving spring means including a first interconnecting drive train for drivably connecting the driving spring means to the rotatable drive shaft for rotating the rotatable drive shaft at a first selected speed, and a second interconnecting train for drivably connecting the driving spring means to the rotor of the electrical generating means for rotating the rotor at a second selected different speed. Speed governing means are provided, the speed governing means being operatively connected between the driving spring means and the first interconnecting drive train for controlling the unwinding of the driving spring means so as to cause the driving spring means to drive the rotatable drive shaft at the first selected speed. The speed governing means is also operatively connected between the driving spring means and the second interconnecting drive train, for controlled unwinding of the driving spring means so as to cause the driving spring means to drive the rotor of the electrical generating means at the second selected different speed.

(c) Other Features of the Invention

In one feature of the audio cassette player of an aspect of the present invention, the interconnecting drive train is connected to drive the rotatable drive shaft at the desired speed to drive the cassette tape progressively through the pick-up, e.g., at 4.75 lineal cm/sec.

In another feature of the audio cassette player, the rotor of the generating means is adapted to be rotated at speeds sufficient to provide constant voltage of 1.5±0.01 volts. Such audio cassette player also may include a Zener diode for fine tuning of the voltage supplied to the amplifying means.

In yet another feature of the audio cassette player, the interconnecting drive train comprises a gear train, the gear train having a driving section which is connected to the spring means and which is common for driving both the rotatable drive shaft and the rotor of the electrical generating means, and two driven sections extending in parallel from the driving section, with one of the driven sections drivably connected to the rotatable drive shaft and the other driven section drivably connected to the rotor of the electrical generating means.

In still another feature of the audio cassette player, the electrical generating means comprises an alternator for producing alternating current and a rectifier which is electrically connected between the alternator and the amplifying means for converting the alternating current into direct current.

By yet another feature of the audio cassette player, a frame is provided comprising top and bottom planar plates which are held in required spaced-apart positions by four corner bolts and spacers received on the bolts and extending between the plates. In another feature, a tape deck platform is disposed above the top plate, the platform being held spaced above the plate by spring-loaded corner posts which provide the platform with a required degree of resilient float, the platform thereby supporting a tape drive mechanism above its upper surface. By still another feature, the tape drive mechanism is driven by a drive shaft carrying a main drive gear which is rotatably received through the platform.

By yet a further feature, a magnetic playback head of the tape deck is electrically connected to an amplification circuit for amplifying the signal received from the head to an audible audio signal. By a further feature, such amplification circuit is provided with electrical power by an electrical generating means which comprises an alternator mounted within and depending from the top frame plate, the alternator being connected to the amplification circuit through an AC to DC rectifier circuit.

By another feature of the audio cassette player, the drive shaft and the rotor shaft of the alternator are both driven by a single mechanical prime mover which comprises a windable driving spring means in the form of a spiral spring, such spring, together with an interconnecting drive train to the spindle and to the rotor of the alternator, being contained between upper and lower frame plates.

By yet another feature of the audio cassette player, the inner end of the spring means is secured to a winding shaft which is pivotally mounted between the upper and lower plates and extends above the upper plate, an upper end of the shaft having means to enable connection to manual winding means.

By yet another feature of the audio cassette player, the drive train is in the form of a gear train which has a driving section connected to the spring and which is common to both the rotatable drive shaft and to the alternator, such driving section comprising a main driving gear rotatably mounted upon a shaft beneath the spring means, a ratchet beneath the gear and secured to the shaft and a pawl mounted upon the gear and engaged with the ratchet, the ratchet and pawl allowing for winding of the spring in a clockwise direction with the gear stationery, the spring being permitted to unwind, thereby transmitting its drive to the gear through the ratchet and pawl.

By a still further feature of the audio cassette player, in the driving section of the gear train, a gear drives a sprocket gear which is drivably connected to a shaft and to a larger diameter coaxial gear, such gear in turn driving a small diameter gear which is drivably connected to the shaft and to a larger diameter coaxial gear. By a feature, the driving section connects with two driven sections of the gear train which operate in parallel; one driven section, which drives the rotatable drive shaft comprising a small diameter gear captive on shaft, the gear being in mesh with another gear, the shaft rotatably extending through the upper frame plate and projecting through the platform to provide, at its upper end, a capstan extending above the tape deck; a second driven section of the gear train which drives the alternator comprising a small diameter gear which drivably secured to the rotor of the alternator and in mesh with a larger diameter gear on shaft, the gear being driven by gear on shaft.

By a still further feature of the audio cassette player, the shaft is provided, between the upper plate and the platform, with a flywheel, the flywheel being adapted to resist any sudden acceleration or deceleration in rotational speed of the shaft to eliminate any distortion in the sound during playback of a tape, a pulley wheel disposed above the flywheel, the pulley wheel being secured to the shaft, and being drivably connected to a driven pulley wheel by a pulley belt, the driven pulley wheel being secured to the drive shaft.

By features of this invention, the speed governing means may be any mechanical device which provides a control over the rate of rotation of a shaft. Among more common areas are the so-called "butterfly" governor, the so-called "fly-ball" governor, the so-called "inertia or centrifugal inertia" governor, the so-called "pendulum" governor, the so-called "Porter" governor, the so-called "Proell" governor, the so-called "Watt" governor, the so-called "shaft" governor, the so-called "spring-loaded" governor, or the so-called "Hartnell" governor. However, a preferred such speed governing means according to another feature of this invention comprises a fixed housing having an inner surface with an axis of generation and being in the form of a circle at any cross-sectional position taken normal to the axis of generation, a rotatable mass disposed within the housing and rotatably drivable by the driving spring means about an axis of rotation coincident with the axis of generation of the inner surface of the housing, the rotatable mass comprising a body and a plurality of arms resiliently flexibly connected at pivotal end regions to the body in spaced positions around the body for resilient pivotal movement of each arm outwardly from the body under centrifugal force as the mass is rotated to cause the arms frictionally to engage the inner surface of the housing, with a resultant frictional drag increasing or decreasing appropriately dependent upon any tendency for rotational speed of the mass to increase or decrease so as to maintain a desired rotational speed of the mass consistent with the predetermined desired speeds of the drive shaft and of the electrical generating means. Preferably, the mass is formed as a single moulded member. Additionally, each arm is stiffer at positions along its length spaced from its pivotal end region than at its pivotal end region whereby resilient outwards pivoting movement of the arm occurs substantially completely at the pivotal end region and the stiffness of the arm influences the degree of frictional pressure applied to the inner surface of the housing. Preferably, each arm has an outer convex surface for engagement with the inner surface of the housing. Still more preferably, with the mass physically at rest, its peripheral surface is substantially circular when viewed in an axial direction and the pivotal end region of each arm is defined between the peripheral surface of the mass and an inner concave surface which provides a progressive widening of the pivotal end region into the arm at one side of the pivotal end region and into the body on the other side of the pivotal end region to allow for stress distribution.

In another preferred speed governing means according to a feature of the invention, the speed governing means includes a fixed housing with an inner surface having an axis of generation which is in the form of a circle at any cross-section normal to the axis of generation. In this preferred structure of speed governing means, a rotatable mass is disposed within the housing and is rotatably drivable by the driving spring about an axis of rotation coincident with the axis of generation of the inner surface of the housing. The rotatable mass has a body and a plurality of arms which are resiliently flexibly connected at pivotal end regions of the arms to the body in spaced positions around the body for pivotal movement of each arm outwards from the body under centrifugal force as the mass is rotated. This causes the arms frictionally to engage the inner surface of the housing and a resultant frictional drag increases or decreases appropriately upon any tendency for rotational speed of the mass to increase or decrease respectively. This action maintains a desired rotational speed of the mass which controls and is consistent with the predetermined desired speeds of each of the drive shaft and the rotor of the electrical generating means. The preferred structure of the speed generating means is particularly pertinent to an aspect of the present invention in that it may be made sufficiently small to be incorporated as part of a portable audio cassette player which, by its very nature, is required to be of as compact a construction as possible. By another feature of the audio cassette player, the mass of the speed governor means is fixed concentrically to a rotatable shaft which is drivably interconnected by gears of the interconnecting drive train to the spring means.

(d) Generalized Description of the Invention

In an audio cassette or compact disc player according to this invention, the use of a battery together with its inherent problems, is completely avoided. Instead of a battery, the windable driving spring means is provided which has a dual function in that it drives not only the rotatable drive shaft, but also the rotor of the electrical generating means which supplies the required electrical power to the amplification means.

The system of this invention is useful in many more embodiments than an audio cassette or compact disc player. It may be used to generate and provide mechanical motion and/or generate electrical energy for many devices. Among them are radios, lamps, games, consoles, lap top computers, children's toys which now include both mechanical movement and generate sound, realistic dolls, etc. It also has utility in cases of power outages and for military communication maintenance.

As noted above, the incorporation of an electrical generating means together with a mechanical prime mover in the form of a windable spring means avoids the necessity of providing electrical power from an outside source, i.e., by the use of a battery. This is of particular importance where the device is portable, although this advantage is seen as also to apply to non-portable devices, i.e., for use in remote areas. In addition, a portable device according to this invention may be used in cold temperature conditions without any deterioration in the capability in its operation. The prime mover in the form of the windable driving spring means is virtually unaffected by such conditions. Further, because the device according to aspects of the invention generates its own electrical power, any concern is avoided regarding the necessity of renewing the reserve of electrical power obtained from an outside source.

A portable device according to this invention is particularly useful in military circumstances as there is no requirement for an outside source of electrical power. In addition, a device according to this invention may remain unused for extended periods and will be found to be in perfect operating condition when its use is next required.

In more general terms, the system of the present invention may be used to power an electrical device, e.g., an audio cassette or compact disc player or a radio. As the power is generated mechanically from the spring motor, no electrical power from power lines is required for the operation of the device. Furthermore, the store of mechanical energy may be replenished by physical effort, that is, by rewinding the spring. There is no necessity to purchase batteries or other energy sources in order to keep the electrical device in working order.

Thus, the electrical device to be powered by system of the present invention may be any type of electrically-powered device currently available. Preferably, however, the electrical device is portable and is one which is unlikely to require substantial electrical power levels.

The prime mover, i.e., the spring, may comprise a logarithmic spring or a spring conforming to Hookes' Law, or a metal band spring arranged to deliver a substantially constant force. For example, the metal band spring may be pre-stressed band of steel.

Means to wind the spring, e.g., a wind-up key is provided and is arranged to wind the metal band spring. This mechanical wind-up process stresses the spring and thus stores mechanical potential energy. The potential energy is thereafter released by the unwinding of the spring and this causes rotation of the rotor of the alternator which thereby generates electrical power. It also provides rotation to a shaft which provides mechanical motion.

Locking means is provided to enable the spring to be locked in its condition storing potential energy. It is an easy matter to wind up the spring motor again when it is required to power the electrical device. However, it is generally preferred to provide appropriate protection mechanisms, e.g., appropriate stops, to prevent overwind or underwind of the spring.

The means to generate the electrical energy may be any type of electrical generator arranged to generate electricity in response to rotation of its rotor. For example, the rotor may be permanent magnet rotor rotatable within a stator carrying one or more electrical coils. Alternatively, the rotor may carry the electrical coils, while the stator carries one or more permanent magnets. It is preferred that it is arranged to be as compact and lightweight as possible. An alternator is preferred where the powered device is to be an audio cassette or compact disc player.

The gear means comprises a series of inter-engaging gears arranged to rotate the main drive shaft at a high speed of rotation. The gear means is designed to gear up the speed of rotation of the main drive shaft to an appropriate speed. The gear means may be constructed in any appropriate manner. Preferably, the gear means comprises a series of inter-engaging gear wheels. The gear means should be arranged to have a low friction and it is also preferred that the gear means is lightweight.

The system thus includes a tensioned steel band spring to rotate a torque output shaft. When in its unstressed position, the spring is wound. This wind-up process thus stresses the spring such that mechanical potential energy is stored in the wound spring. The energy stored, and the torque generated thereby is subsequently delivered.

When the spring has been wound, it tries to unwind to release the stress to which it has been subjected, and in doing so rotates the main drive shaft. The main drive shaft is connected by a series of gears to the mechanical motion apparatus and the rotor of the electrical generator. The gear means comprises a plurality of gear wheels which are intermeshed and which are arranged to gear up the rotation of the main output shaft.

BRIEF DESCRIPTION OF THE DRAWINGS

In the accompanying drawings.

Figure 1:
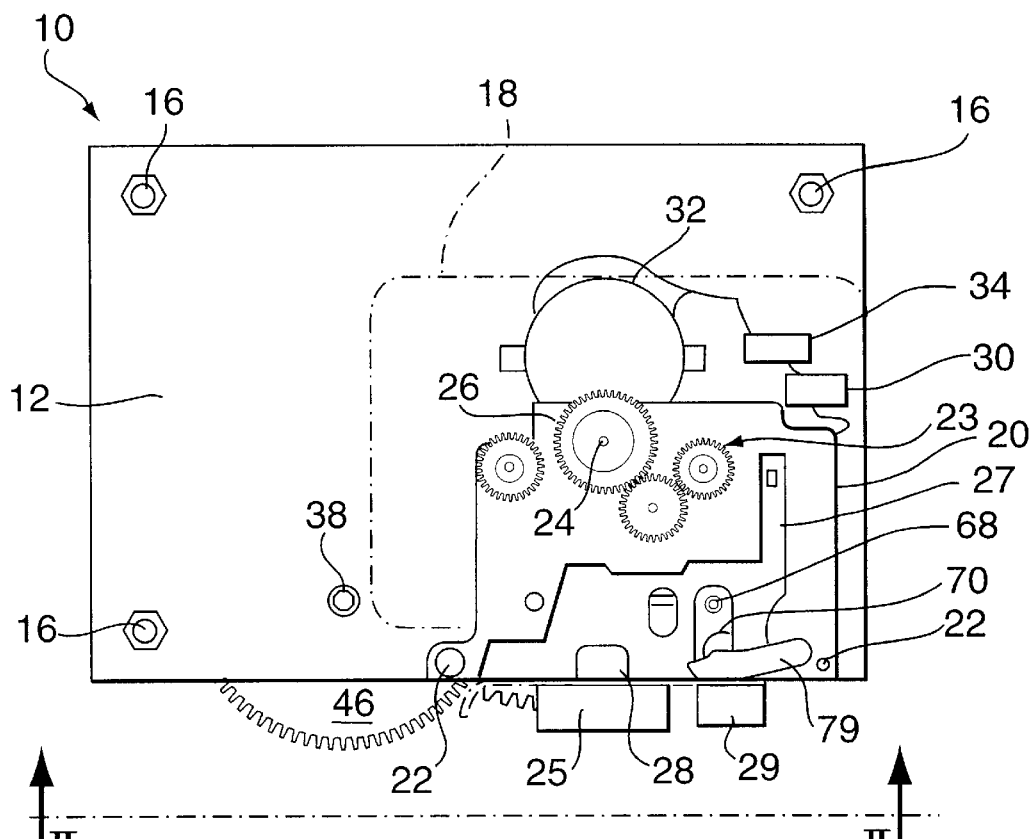
FIG. 1 is a plan view of the inside structure of a portable audio cassette player of one embodiment of the invention with an outside cover removed.
Figure 2:
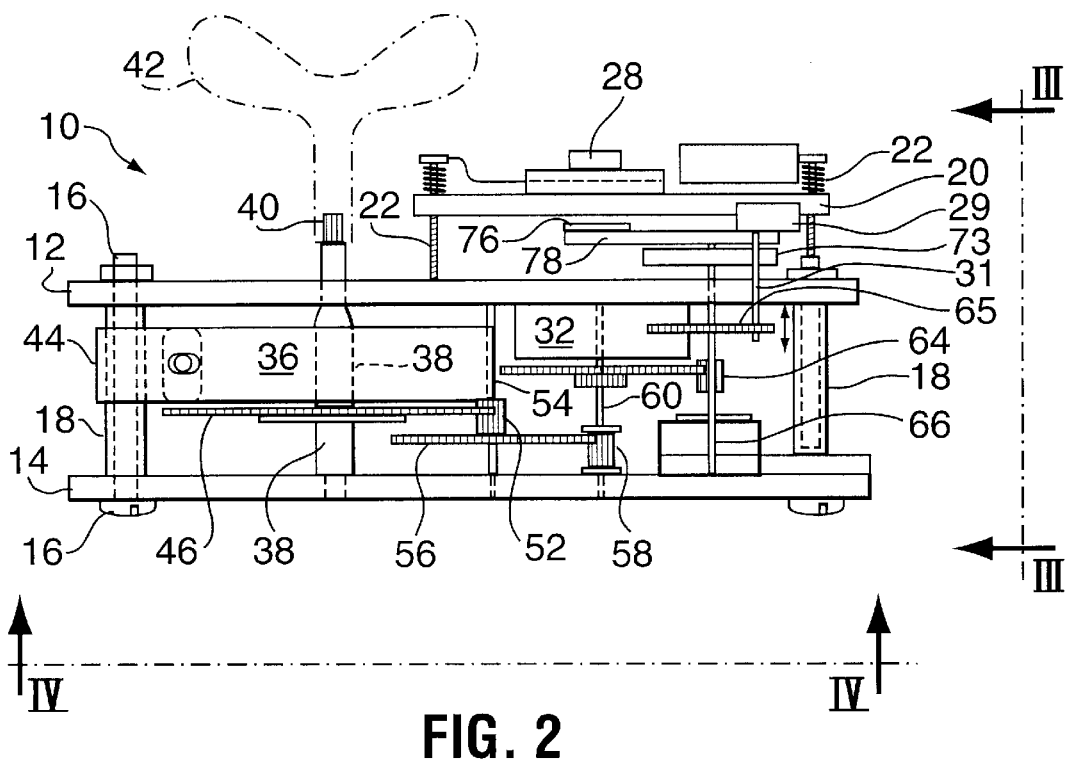
FIG. 2 is an elevational view of the player viewed from the direction of arrow II—II in FIG. 1.

DESCRIPTION OF PREFERRED EMBODIMENTS (a) Description of FIGS. 1 to 7

As shown in FIGS. 1 to 7, a portable audio cassette player 10 comprises a frame comprising top and bottom planar plates 12 and 14, which are held in required spaced-apart positions by four corner bolts 16 and spacers 18 received on the bolts and extending between the plates 12 and 14. Above the plate 12 is disposed a tape deck, comprising a tape deck platform 20 of known construction, the tape deck platform being shown in planar form. The platform 20 is held spaced above the plate 12 by spring-loaded corner posts 22 which provide the platform 20 with a required degree of resilient float for known reasons. The platform 20 supports a tape drive mechanism 23 above its upper surface (see FIG. 1 particularly). The tape drive mechanism is of known construction and will not be further described except to indicate that the mechanism 23 is driven by a drive shaft 24 carrying a main drive gear 26 of mechanism 23 and rotatably received through the platform 20.

Figure 3:
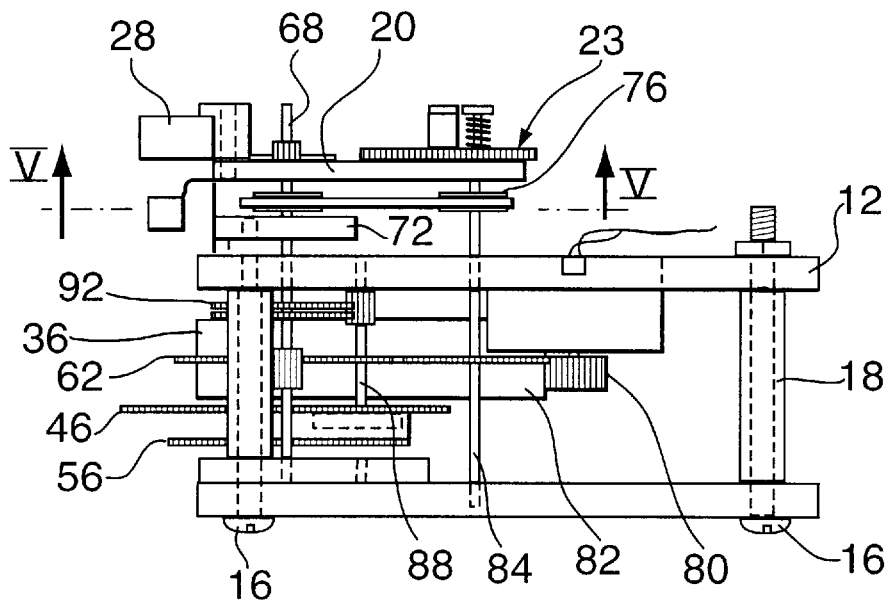
FIG. 3 is an elevational view of the player viewed from the direction of arrows III—III in FIG. 2.

Also conventionally, the tape deck is provided with a magnetic playback head 28 which is disposed appropriately in a signal pick-up station at one side of the platform and of the frame plate 12 as shown, for instance, in FIGS. 1 and 3. In known manner for portable audio cassette players, the playback head 28 is electrically connected to a suitable amplification circuit (indicated diagrammatically as item 30 FIG. 1) for amplifying the signal received from the head to an audible audio signal.

Still further, conventionally, the tape drive mechanism includes a "play" button 25 which moves plate 27 to engage into a "play" position, and a "stop" button 29. Stop button 29 includes vertically-moveable pin 31 which can be inserted between the teeth of gear 65 mounted on shaft 68 to stop the movement of the tape.

By this structure, means are provided for: driving the tape at the standard speed in order for the electromagnetic head to read the signal on the tape (equivalent to "play"); disengaging the electromagnetic head and advancing the tape at high speed (equivalent to "fast forward"); and disengaging the head while interrupting the drive train, so that the ribbon no longer advances (equivalent to "stop"). In addition the spring no longer rotates the rotatable drive shaft.

The amplification circuit 30 is provided with electrical power by an electrical generating means which comprises an alternator 32 mounted within and depending from the frame plate 12. The alternator is connected to the amplification circuit 30 through an AC to DC rectifier circuit 34, also shown diagrammatically in FIG. 1.

The drive shaft 24 and the rotor shaft of the alternator 32 are both driven by a single mechanical prime mover which comprises a windable driving spring means in the form of a spiral spring 36. This spring, together with an interconnecting drive train to the spindle 26 and to the rotor of the alternator 32, is contained between the frame plates 12 and 14 as will now be described. In one specific embodiment, the spiral spring 36 may be made from pre-stressed steel with a thickness of 0.61 mm, width 15.63 mm and a length of 1250 mm. For winding purposes, an inner end of the spring 36 is secured to a winding shaft 38 (FIGS. 2, 4, 6 and 7) which is pivotally mounted between the plates 12 and 14 and extends above the plate 12. An upper end 40 of the shaft 38 is of square cross-section suitable for manual winding with a key 42 (in chain-dotted outline in FIG. 2). An outer end 44 of the spring 36 is permanently secured around one of the corner spacers 18 extending between the plates 12 and 14.

Figure 4:
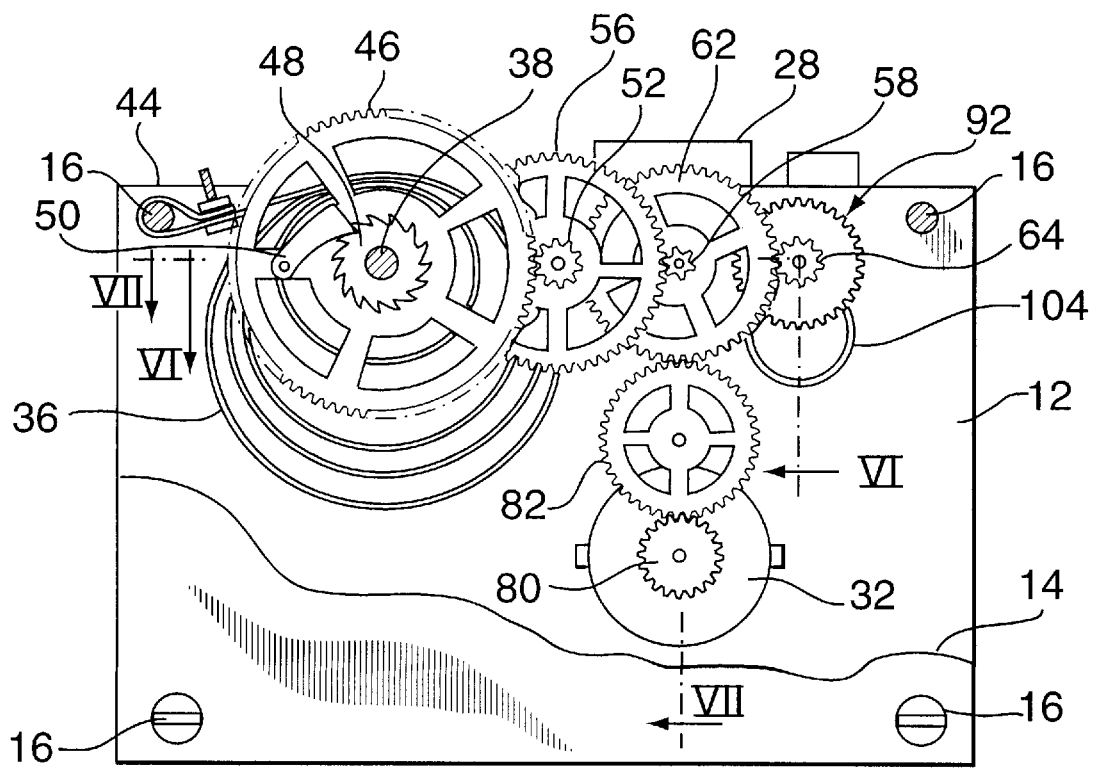
FIG. 4 is an underside view of the player viewed from the direction arrows IV—IV in FIG. 2, with part of a frame of the audio cassette player removed for clarity.
Figure 5:
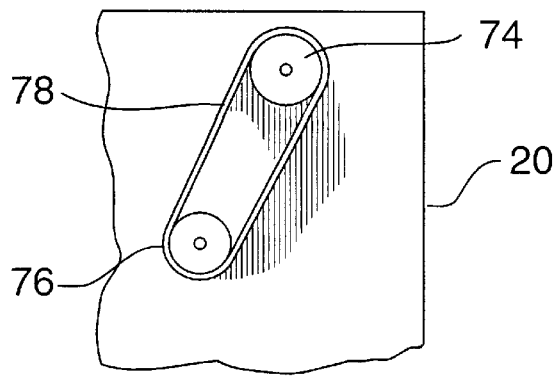
FIG. 5 is a cross-sectional view of part of the audio cassette player taken along line V—V in FIG. 3.

The drive train is in the form of a gear train which has a driving section connected to the spring 36 and which is common to both the rotatable drive shaft 24 and to the alternator 32. This driving section comprises a main driving gear 46 which is rotatably mounted upon the shaft 38 beneath the spring 36 as shown in FIG. 4. Beneath the gear 46 is disposed a ratchet 48 which is secured to the shaft 38 and a pawl 50, which is mounted upon the gear 46 and engaged with the ratchet 48. The ratchet 48 and pawl 50 allow for winding of the spring 36 in a clockwise direction (as viewed in FIG. 4) with the gear 46 stationary. The spring 36, however, cannot unwind (i.e. anticlockwise) without transmitting its drive to the gear 46 through the ratchet and pawl. Means are provided in association with the spring to override the ratchet and pawl to permit unwinding of the spring.

It is intended that the drive shaft 24 and the alternator 32 both be driven at operational speeds far in excess of the unwinding speed of the spring 36. The gear train takes account of this requirement. The gear train is shown in FIGS. 6 and 7 in particular in which parts of the player unnecessary to this part of the description are not included for purposes of clarity.

In the driving section of the gear train, the gear 46 drives a sprocket gear 52, which is drivably connected to a shaft 54, and a larger diameter coaxial gear 56. The gear 56 in turn drives a small diameter gear 58, which is drivably connected to shaft 60, and a larger diameter coaxial gear 62. This completes the driving section of the gear train.

The driving section connects with two driven sections of the gear train which operate in parallel. One driven section, which drives the rotatable drive shaft 24 from the tape drive (FIG. 6), comprises a small diameter gear 64 which is captive on shaft 66, the gear 64 being in mesh with the gear 62. The shaft 66 also drives gear 65 and rotatably extends through the upper frame plate 12 and projects through the platform 20 to provide at its upper end a capstan 68 extending above the tape deck. This capstan 68 (FIG. 1) is of known construction and usage and co-operates with pinch roller 70 mounted on a pivotal arm 79 above the platform 20. The capstan 68 and the pinch roller 70 co-operate in known manner for driving a cassette tape forward at an industry standard speed of 4.75 cms per second.

Figure 6:
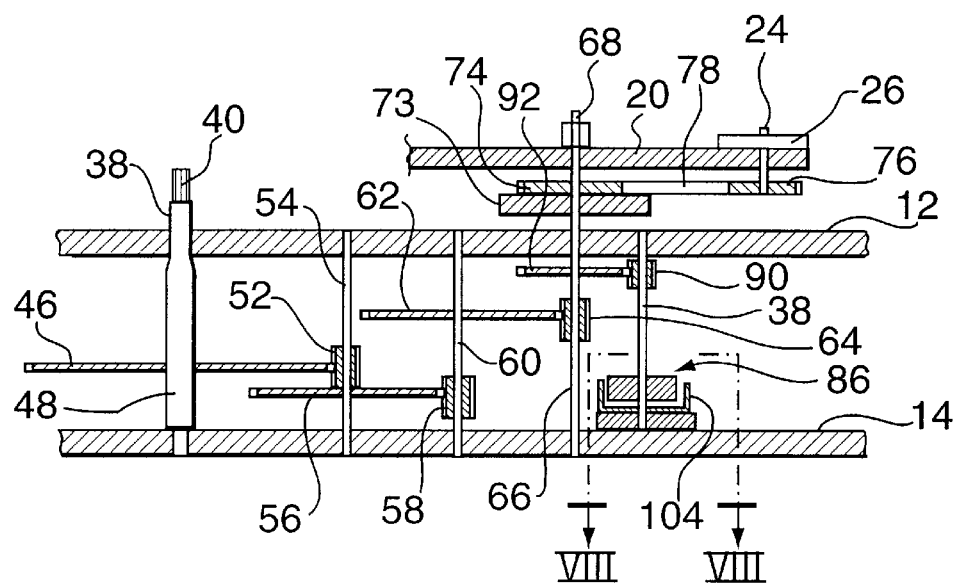
FIGS. 6 and 7 are cross-sectional views taken along lines VI—VI and VII—VII in FIG. 4, respectively.
Figure 7:
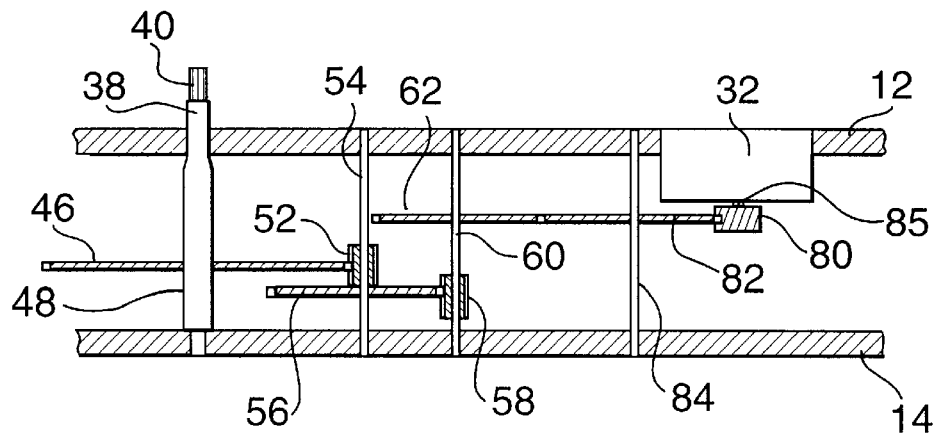

As may be seen most clearly from FIG. 6, the shaft 66 is provided between the plate 12 and the platform 20 with a flywheel 73. The flywheel 73 resists any sudden acceleration or deceleration in rotational speed of the shaft 66 to eliminate any distortion in the sound during playback of a tape. Immediately above the flywheel 73 is disposed a pulley wheel 74 which is secured to the shaft 66 (see also FIG. 5). The pulley wheel 74 is drivably connected to a driven pulley wheel 76 by a pulley belt 78. The driven pulley wheel 76 is secured to the drive shaft 24 thereby completing the driven section to the drive shaft 24.

A second driven section of the gear train which drives an electricity generator, i.e., an alternator 32 (FIG. 7) comprises a small diameter gear 80 which is drivably secured to the rotor 85 of the alternator 32 and which is in mesh with a larger diameter gear 82 on shaft 84, the gear 82 being driven by gear 62 on shaft 60. The gear ratio between the spring 36 and the alternator 32 may generally be of the order of 1:1000.

Figure 8:
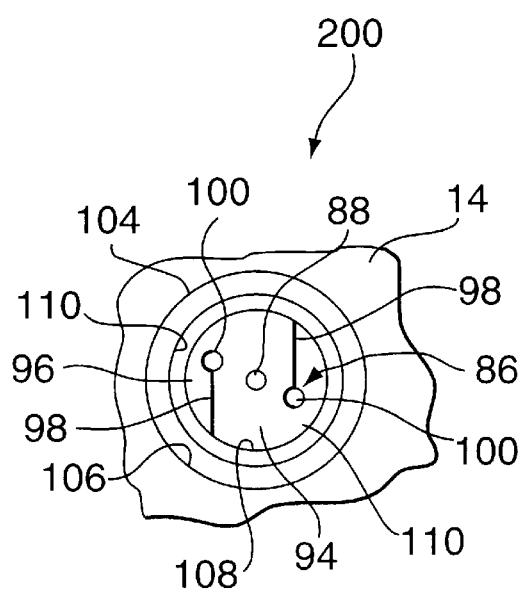
FIG. 8 is a cross-sectional view of the governor part of the audio cassette player taken along line VIII—VIII in FIG. 6.
Figure 9:
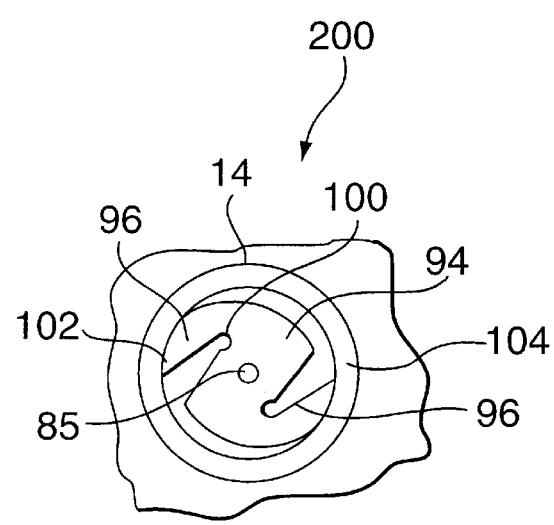
FIG. 9 is a view similar to FIG. 8 with the audio cassette player in operation.

(b) Description of FIGS. 8 and 9

A speed governing means 200 (as seen in FIGS. 8 and 9) is provided for controlling unwinding of the spring 36 so as to ensure that the drive shaft 24 and the rotor 85 of the alternator 32 are each driven at their own predetermined desired speeds consistent with generally-recognized requirements. Particularly as shown by FIG. 8, the speed governing means 200 comprises a rotatable mass 86 which is secured towards the lower end of a rotatable shaft 88 extending between top and bottom plates 12 and 14. The shaft 88 is rotatably driven by the spring 36 through a small diameter gear 90 which is mounted on the shaft, (FIG. 6), the gear 90 being in mesh with a gear 92 which is secured to the shaft 66. The mass 86 acts as a fly wheel and comprises a main body 94 which is rotatable around the axis of shaft 88, and two arms 96 which are spaced apart on opposite sides of the body 94. The arms 96 are resiliently flexibly connected at pivoting end regions 110 to the body 94 and are integrally formed with the body from resilient rubber, e.g., by a moulding operation. In axial view, as shown in FIG. 8, the mass 86 is of circular configuration when stationary. In a stationary position, each arm is in a radially inner position to form, with the body, a slit 98 which lies along a chord of the circular section. Each slit 98 opens at the peripheral surface of the mass 86 at one end and terminates at the other or closed end in a circular through hole 100. The surface of hole 100 provides a concave surface at the pivotal end region of the respective arm so that there is a progressive widening of the pivotal end region around the surface of the hole both into the arm and into the body so as to allow for stress distribution during use. As may be seen, each slit 98 ensures that its arm 96 first increases in width as it extends from the pivotal end region, because of the circular outside shape of the mass, and then decreases in width to a free end 102 of the arm. This shaping of the arm ensures that the arm is stiffer at positions along its length which are spaced from the pivotal end region.

The speed governing means also includes a stationery housing 104 which has an inner surface 106 of circular configuration and an axis of generation coincident with the axis of rotation of the shaft 88. The housing 104 is secured to the lower frame plate 14 (FIG. 6). When stationary, the outer circumference 108 of mass 94 is out of contact with the inner circumference 106 of stationary housing 104.

In operation with an audio cassette tape 118 mounted upon the platform 20 in the tape deck, i.e. in the chain-dotted outlined position shown in FIG. 1, the spring 36 is caused to impart its drive to the gear train. Through the gear train, the spring 36 drives both the rotor 85 of the alternator 32 and the drive shaft 24 and causes the speed governor mass 86 to rotate. The gear ratio between the spring 36 and the mass 86 may desirably be of the order of 1:4020. As the mass 86 is rotated, centrifugal force causes the arms 96 to be pivoted outwards about their pivotal end regions 110 thereby causing their engagement with the inner surface 106 of the housing 104. The arms are more rigid along their length than at their pivotal end regions 110 and apply frictional pressure against the inner surface of the housing. This produces a resultant frictional drag which increases or decreases appropriately as the arms tend to move further inwards or outward dependent upon the tendency for the rotational speed of the mass to increase or decrease. Thus the mass 86 is caused to slow down if it tends to rotate too fast or is allowed to speed up should there be a tendency for it to be rotating too slowly. As a result, the rotational speed of the mass 86 (and hence shaft 88) is maintained at its desired speed consistent with providing the predetermined desired speeds of each of the drive shaft 24 and the rotor 85 for the electrical generating means 32.

Hence the tape 118 is fed at its desired speed through the pick-up station to enable the playback head to receive magnetic signals from the tape and relay these signals to the amplification circuit 30. The alternator 32 provides electrical power, which may be e.g., of 1.5 volts output, through the rectifier circuit 34 to the amplification circuit 32 so that sound from the tape may be heard by the user through a pair of earphones. It should be noted that although the alternator 32 is driven by its own driven gear section and that the governing means is provided upon the other driven gear section for rotating the drive shaft 24, nevertheless the governor controls the driven speed of the shaft 85 of the alternator 32 as well as that of the drive shaft 24. As indicated, the voltage output from the alternator 32 is of the order of 1.5 volts. However, although this voltage is held constant by the effect of the speed governing means, nevertheless a Zener diode (not shown) may be included in the circuit to provide fine tuning to the voltage.

As may be seen in the above embodiment, the portable audio cassette player is not dependent in use in any way upon batteries. Instead, the audio cassette player is driven in its entirety by a mechanical prime mover in the form of the spring 36. This spring 36 operates both the drive shaft 24 and also the rotor shaft 85 of the alternator 32 for generating the electrical power necessary for the amplification of the sound.

SUMMARY

Thus, it is seen that the present invention provides many useful advantages in many parts of the world, while electrical radios and audio cassette or compact disc players are widespread, there is no central electrical power supply. Therefore, such devices are battery powered. However, the batteries themselves are not always easily available, and even if they are, are generally very expensive compared with the local cost of living. For this reason, the owners generally operate their radios only infrequently so that they can save and conserve battery power. This is a disadvantage in a region where it would be advisable and advantageous for information could be made available much more readily to the local people.

The present invention thus provides a portable electrical audio cassette or compact disc player or radio which can be powered simply by winding it up, as was the case with clockwork clocks and watches. This means that no batteries have to be obtained.

Such devices, which do not require batteries, are also environmentally and economically advantageous, particularly in rural, poor communities. Presently, many poor economies spend a disproportionately large proportion of their resources on acquiring batteries for electrical devices. Where the financial resources are not available, natural resources are utilized to fund the acquisition with consequent disadvantage to the present and future economy. Furthermore, there is a problem of disposal of the spent batteries which contaminate the land if they are buried and land which might have been utilized for agriculture becomes unavailable. All of these ecological problems are avoided by the use of wind-up devices provided by aspects of the present invention.

As discussed hereinabove, the electrical device powered by the stored mechanical energy may be a device other than an audio cassette, or compact disc player, or radio. The invention also has many other applications. For example, travellers may find it more convenient to carry mechanically-powered electrical devices on their travels so that they are not let down if the battery runs out. Travellers will not then have to carry spare batteries or to try to find compatible replacements in a foreign country.

The invention is also particularly useful for emergency applications where an electrical device is not used frequently but must be available for use reliably. For example, if a battery-powered radio and/or transmitter is provided in a life-raft or life-boat, it is currently necessary to check the batteries frequency to ensure power is available as and when required. The wind-up device of aspects of the present invention has the advantage that, once it has been wound up, it reliably provides power.

Because of the avoidance of the use of batteries the audio cassette player (and any other such device) provide various advantages. For instance, such device may be used in extremes of cold weather without the temperatures affecting the performance of the spring. As there is no dependence upon the requirement for dry batteries, this causes no problem in isolated geographical regions. In addition, because no battery operation is required, the device may be left unused almost indefinitely with the assurance that it will operate in a positive fashion when next it is required for use. With all of the above advantages, the device of aspects of this invention is also suitable for military applications.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

The embodiments of the invention in which an exclusive right or privilege is claimed are defined as follows:

1. A system for simultaneously providing mechanical motion driven by a rotatable drive shaft which is rotating at a continuous predetermined desired speed, and for generating a voltage output by electrical generating means having a rotor which is rotating at a continuous predetermined desired speed, said rotatable drive shaft being non-concentric with, being laterally-spaced-apart from, and being parallel to said rotor, said system including a prime mover, said prime mover comprising:

a windable driving spring means, said driving spring means including an interconnecting drive train for separately drivably connecting said driving spring means both to said rotatable drive shaft and to said rotor of said electrical generating means; said interconnecting drive train comprising a gear train, said gear train having a driving section which is connected to said driving spring means and which is common for driving both said rotatable drive shaft and said rotor of said electrical generating means, and two driven sections which are laterally-spaced-apart from one another, said two driven sections extending in parallel from said driving section, with one of said driven sections being drivably-connected to said rotatable drive shaft and the other one of said driven sections being drivably-connected to said rotor of said electrical generating means; and speed governing means for controlling the unwinding of said driving spring means so as to cause said driving spring means to drive both said rotatable drive shaft and said rotor of said electrical generating means at said respective continuous predetermined desired speeds.

2. An audio cassette player comprising:

an audio play-back head located in a signal pick-up station;

a tape drive mechanism comprising a rotatable drive shaft which is rotating at a continuous predetermined desired speed, for driving an audio cassette tape in lineal movement progressively through said signal pick-up station to permit said play-back head to receive signals from said audio cassette tape;

amplifying means which are electrically-connected to said play-back head for receiving signals from said play-back head;

electrical generating means for generating a voltage output including a rotor which is rotating at a continuous predetermined desired speed, for providing electrical power to said amplifying means, said rotatable drive shaft being non-concentric with, being laterally-spaced-apart from, and being parallel to said rotor; and a prime mover comprising:

a windable driving spring means, said driving spring means including an interconnecting drive train for separately drivably connecting said driving spring means both to said rotatable drive shaft and to said rotor of said electrical generating means, said interconnecting drive train comprising a gear train, said gear train having a driving section which is connected to said driving spring means and which is common for driving both said rotatable drive shaft and said rotor of said electrical generating means, and two driven sections which are laterally-spaced-apart from one another, said two driven sections extending in parallel from said driving section, with one of said driven sections being drivably-connected to said rotatable drive shaft and with the other of said driven sections being drivably-connected to said rotor of said electrical generating means; and speed governing means for controlling the unwinding of said driving spring means so as to cause said driving spring means to drive both said rotatable drive shaft and said rotor of said electrical generating means at said respective continuous predetermined desired speeds.

3. The audio cassette player according to claim 2 which is portable.

4. The audio cassette player according to claim 2 wherein said interconnecting drive train is connected to drive said rotatable drive shaft at said continuous predetermined desired speed to drive said cassette tape in lineal movement progressively through said pick-up station at about 4.5 lineal cm per second; and also is connected to drive said rotor of said generating means said continuous predetermined speed which is sufficient to provide substantially constant voltage.

5. The audio cassette player according to claim 2 wherein said electrical generating means comprises an alternator for producing alternating current, said alternator including a driven alternator rotor, and a rectifier which is electrically-connected between said alternator and said amplifying means for converting said alternating current into direct current.

6. The audio cassette player according to claim 2 including a frame comprising a top planar plate and a bottom planar plate, said plates being held in required spaced-apart positions by four corner bolts and spacers received on said bolts and extending between said plates, wherein said tape drive mechanism is driven by a tape drive shaft which carries a main drive gear which is rotatably received between said top planar plate and said bottom planar plate; and including a tape deck platform which is disposed above said top planar plate, said tape deck platform being held spaced above said top planar plate by spring-loaded corner posts which provide said tape deck platform with a required degree of resilient float, said tape deck platform thereby supporting said tape drive mechanism above its upper surface.

7. The audio cassette player according to claim 6 wherein said play-back head comprises a magnetic play-back head which is electrically connected to an amplification circuit for amplifying a signal received from said magnetic play-back head to an audible audio signal, and wherein said amplification circuit is provided with electrical power by said electrical generating means, said electrical generating means comprising an alternator having a driven alternator rotor, said alternator being mounted within, and depending from, said top planar plate, said alternator being connected to said amplification circuit through an AC to DC rectifier circuit.

8. The audio cassette player according to claim 7, wherein said rotatable drive shaft and said driven alternator rotor of the said alternator are driven by a single mechanical prime mover which comprises said windable driving spring means in the form of a spiral spring, said spiral spring, together with said interconnecting drive train which is connected both to said drive shaft and to said driven alternator rotor of said alternator, being contained between said top planar plate and said bottom planar plate.

9. The audio cassette player according to claim 7, wherein said driving spring means includes an inner end and an outer end, wherein said inner end of said driving spring means is secured to a winding shaft, said winding shaft having a lower end and an upper end, said lower end of said winding shaft being pivotally mounted between said top planar plate and said bottom planar plate and extending above said top planar plate, said upper end of said winding shaft being adapted to be associated with manual winding key means.

10. The audio cassette player according to claim 7, wherein said interconnecting drive train is in the form of a gear train which has a driving section which is connected to said driving spring means and which is common both to said rotatable drive shaft and to said driven alternator rotor of said alternator, said driving section comprising a main driving gear which is rotatably mounted upon a gear shaft which is located beneath said driving spring means, a ratchet which is located beneath said main driving gear, said ratchet being secured to said rotatable drive shaft, a pawl mounted upon said main driving gear and engaged with said ratchet, said ratchet and pawl thereby allowing for winding of said driving spring means in a clockwise direction while holding said main driving gear stationery, and permitting said driving spring means to unwind, thereby transmitting its drive to said main driving gear through said ratchet and said pawl;

wherein, said driving section of said gear train, includes a further gear, said further gear driving a sprocket gear, said sprocket gear being drivably connected to a first coaxial gear shaft and to a coaxial gear, said coaxial gear having a diameter which is larger than that of said sprocket gear, said coaxial gear driving a second gear having a diameter which is smaller than that of said coaxial gear, said coaxial gear driving said second gear, said second gear being drivably connected to said coaxial gear shaft and to a second coaxial gear, said second coaxial gear having a diameter which is larger than that of said first coaxial gear; and wherein said driving section connects with two driven sections of said gear train, said two driven sections operating in parallel; one driven section, which drives said rotatable drive shaft comprising a first driven gear which is captive on said portable drive shaft, said gear being in mesh with a second driven gear, said rotatable drive shaft rotatably extending through said top planar plate and projecting through said tape deck platform, said rotatable drive shaft having an upper end, said upper end comprising a capstan which extends above said tape deck platform; and a driven section which drives said driven alternator rotor of said alternator, said second driven section comprising a third gear which is drivably secured to said driven alternator rotor of said alternator, said third gear being in mesh with a fourth gear on a second drive shaft, said fourth gear having a diameter which is larger than that of said third gear, said fourth gear being driven by a fifth gear on a third drive shaft.

11. The audio cassette player according to claim 10, including a flywheel, said flywheel being secured to said rotatable drive shaft between said top planar plate and said tape deck platform, said flywheel being adapted to resist any sudden acceleration or deceleration in rotational speed of said rotatable drive shaft to eliminate any distortion in sound during playback of a tape; and including a pulley wheel which is disposed above said flywheel, said pulley wheel being secured to said rotatable drive shaft, and being drivably connected to a further driven pulley wheel by a pulley belt, said further driven pulley wheel being secured to a drive shaft which carries a main drive gear of a tape drive mechanism.

12. The audio cassette player according to claim 7 including a vertically-movable pin, a "stop" button on said tape drive mechanism, said vertically-movable pin being connected to said "stop" button to stop the rotation of said main drive gear driving said tape drive shaft, thereby stopping the lineal movement of said tape.

13. The audio cassette player according to claim 7 wherein said speed governing means comprises a fixed housing having an inner surface with an axis of generation and which is in the form of a circle at any cross-sectional position taken normal to said axis of generation, a rotatable mass disposed within said fixed housing, said rotatable mass being rotatably drivable by said driving spring means about an axis of rotation which is coincident with an axis of generation of said inner surface of said fixed housing, said rotatable mass comprising a body and a plurality of arms, said arms each having an inner pivotal end and an outer engagement end, each said arm being resiliently and flexibly connected at its respective said pivotal end to said body in radially-spaced positions around said body for resilient pivotal movement of each arm outwardly from said body under centrifugal force as said mass is rotated to cause said respective outer engagement end of respective arms frictionally to engage said inner surface of said fixed housing, thereby to create a resultant frictional drag which is increasing or decreasing appropriately dependent upon any tendency for rotational speed of said mass to increase or decrease respectively, so as to maintain a desired rotational speed of said mass consistent with said respective continuous predetermined desired speeds of said rotatable drive shaft and of said driven alternator rotor of said alternator.

14. An audio cassette player according to claim 13 wherein said mass is formed as a single molded member; wherein each arm is stiffer at positions along its length spaced from its said pivotal end than at its said outer engagement end, whereby resilient outwards pivoting movement of each said arm occurs substantially-completely at said pivotal end and whereby the stiffness of each said arm influences the degree of frictional pressure applied to said inner surface of said housing; wherein each said arm has an outer convex surface for engagement with said inner surface of said housing by said respective engagement end; wherein, with said mass physically at rest, the peripheral surface of said mass is substantially-circular when viewed in an axial direction, and wherein said pivotal end of each said arm is defined between the peripheral surface of said mass and an inner concave surface which provides a progressive widening of said pivotal end into each said arm at one side of said pivotal end and into said body on a side of said pivotal end region to allow for stress distribution; and including an auxiliary rotatable shaft, said mass being fixed concentrically to said auxiliary rotatable shaft, said auxiliary rotatable shaft being drivably interconnected by gears of said interconnecting drive train to said driving spring means.

* * * * *